(12) United States Patent
Alli et al.

(10) Patent No.: US 6,569,484 B1
(45) Date of Patent: May 27, 2003

(54) HIGH GELLING PROTEIN AND A PROCESS FOR OBTAINING SAME FROM SOYBEAN

(75) Inventors: Inteaz Alli, Baie d'Urfée (CA); Ramadan Abdolgader, Ste-Anne-de-Bellevue (CA)

(73) Assignee: McGill University, Montreal (CA)

( * ) Notice: Subject to any disclaimer, the term of this patent is extended or adjusted under 35 U.S.C. 154(b) by 0 days.

(21) Appl. No.: 09/642,898

(22) Filed: Aug. 21, 2000

Related U.S. Application Data

(60) Provisional application No. 60/113,131, filed on Dec. 21, 1998.

(51) Int. Cl.[7] .................................................. A23L 1/05
(52) U.S. Cl. ....................... 426/573; 426/656; 426/459; 426/507
(58) Field of Search ................................ 426/573, 656, 426/425, 431, 459, 507

(56) References Cited

U.S. PATENT DOCUMENTS 3,870,801 A * 3/1975 Tombs .......................... 426/92
4,172,828 A 10/1979 Davidson et al.
4,855,159 A * 8/1989 Takao ......................... 426/656

OTHER PUBLICATIONS

Takao Nagano, et al., *J. Agric. Food Chem.* vol. 40, pp. 941–944, 1992.
Ioannis S. Chronakis, et al., *Food Hydrocolloids*, vol. 7, No. 6, pp. 459–478, 1993.
I.C. Peng, et al., *Cereal Chem.*, vol. 6, No. 6, pp. 480–490.
S. Barbut, et al., *Food Research International*, vol. 30, No. 2, pp. 153–157, 1997.
Parichat Hongsprabhas, et al., *Food Research International*, vol. 29, No. 2, pp. 135–139, 1996.
Parichat Hongsprabhas, et al., *Food Research International*, vol. 30, No. 7, pp. 523–527, 1998.
Z.Y. Ju, et al., *Journal of Food Science*, vol. 63, No. 2, pp. 288–292, 1998.

* cited by examiner

Primary Examiner—Nina Bhat
(74) Attorney, Agent, or Firm—Nixon Peabody LLP

(57) ABSTRACT

A process is described to provide a protein fraction with high functionality, in particular high gelling, including gelling by the process of cold-set gelation and high solubility properties, and to a process for obtaining same. The process comprises extracting the gelling protein from ground defatted soybean with an alkaline solution. Optionally, the gelling protein is isolated by centrifugation of the alkaline solution to obtain a supernatant comprising the gelling protein, precipitation of the gelling protein from the supernatant, and sedimentation of the so-precipitated gelling protein.

12 Claims, 1 Drawing Sheet

HIGH GELLING PROTEIN AND A PROCESS FOR OBTAINING SAME FROM SOYBEAN

This application claims benefit under 35 U.S.C. 119(e) of provisional application 60/113,131 filed Dec. 21, 1998.

BACKGROUND OF THE INVENTION (a) Field of the Invention

The invention relates Lo a protein fraction with high functionality, in particular high gelling and high solubility properties, and to a process for obtaining same.

(b) Description of Prior Art

The common gelling ingredients of foods are carbohydrates and proteins. Among proteins, gelatin and whey proteins are common gelling proteins from animal sources while soybean proteins are the common gelling proteins from plant sources. The diversity of food applications for gelling proteins requires proteins having different molecular structures which will determine the particular characteristics of the gel.

Heat-induced gelation is the common technique for food gelling applications involving proteins such as whey proteins and soybean proteins. Heat-induced gelation of whey proteins has been extensively reported. The ability of whey protein to form a gel at room temperature, after a pre-heat treatment, has also been reported (this phenomena is called cold-set gelation).

Few reports have been published on cold-set gelation. These mainly reported the effects of preheat treatments or denaturation levels on rheological properties of cold-set gels. Results consistently showed that more severe preheat treatments led to higher gel strength or shear stress. The strength or shear stress of gels was also dependent on added salt concentration in the post-denaturation step.

Cold-set gelation of whey proteins requires the initial preheat step to denature the whey proteins, followed by an incubation with such additives as salts, acidulants, or proteases. Cold set gelation has only been observed with whey proteins.

Cold-set gelation has potential applications in the food industry, in various foods, such as in surimi, pressed ham, spreads and bakery products.

Therefore, it would be highly desirable to be provided with a high-gelling protein with cold-set gelation abilities as a substitute for cold set whey proteins such as for non-dairy applications.

SUMMARY OF THE INVENTION

One aim of the present invention is to provide a cold-set gelling protein extracted from ground defatted soybean which forms strong protein gels and which has high solubility properties.

Another aim of the present invention is to provide a method for extracting such gelling protein.

In accordance with the present invention there is provided a process for obtaining a gelling protein from defatted soybean. The process comprises the steps of:

(i) extracting proteins from ground defatted soybean with an alkaline solution; and (ii) precipitating the high gelling protein from proteins extracted in step (i) by cryoprecipitation.

The process may optionally further comprise before step (ii) the step of:

a) centrifuging the alkaline solution for obtaining a clarified supernatant containing the gelling protein.

The process preferably further comprises after step (ii), the step of:

(iii) isolating the gelling protein from step (ii).

The gelling protein may be isolated by a centrifugation after the cryoprecipitation for obtaining a pellet containing the gelling protein, and isolating the pellet.

The process may preferably further comprise after step (iii) the step of:

(iv) isoelectric precipitating of an alkaline solution obtained after the isolating of step (iii).

The isoelectric precipitating may optionally comprise a step of:

(v) adjusting the alkaline solution obtained after the isolating of step (iii) to a pH of about 4.5.

In a preferred embodiment, the process may further comprise after the step (iv) of isoelectric precipitating, a step of separation of a protein isolate for use in food industries and a supernatant containing oligosaccharides. The supernatant containing oligosaccharides is preferably recycled and reused in a further step (i) of the process for obtaining a gelling protein. The oligosaccharides may be recovered from the supernatant containing oligosaccharides after being recycled and reused.

In accordance with the present invention there is also provided a process for producing a cold-set gel comprising a gelling protein obtained by the process described above. The process comprises the steps of:

i) making an aqueous dispersion of the gelling protein;

ii) heating the dispersion to 60 to 90° C.;

iii) adding a salt to the dispersion of step ii); and iv) allowing for the dispersion of step iii) to set.

The salt added in step iii) is preferably selected from the group consisting of calcium chloride, sodium chloride, magnesium chloride, calcium sulfate, and magnesium sulfate.

In accordance with the present invention, there is also provided a gelling protein obtained with the process of the present invention. The gelling protein may be induced to gel by cold-set gelation.

In a further embodiment of the present invention, there is also provided a gel comprising the gelling protein of the present invention, in which the gel is induced by cold-set gelation of a solution comprising the gelling protein.

The protein of the present invention forms strong gels of concentrations similar to, or lower, than those required for gels from whey protein concentrates or other soybean protein preparations. These gels maintain good gelling characteristics during storage. These high gelling and high solubility properties make the protein of the present invention a suitable substitute for situations where non-dairy protein products are required and for fortifying both soy-based products such as soymilk and tofu as well as non soy-based protein food products.

DETAILED DESCRIPTION OF THE INVENTION

Figure 1:
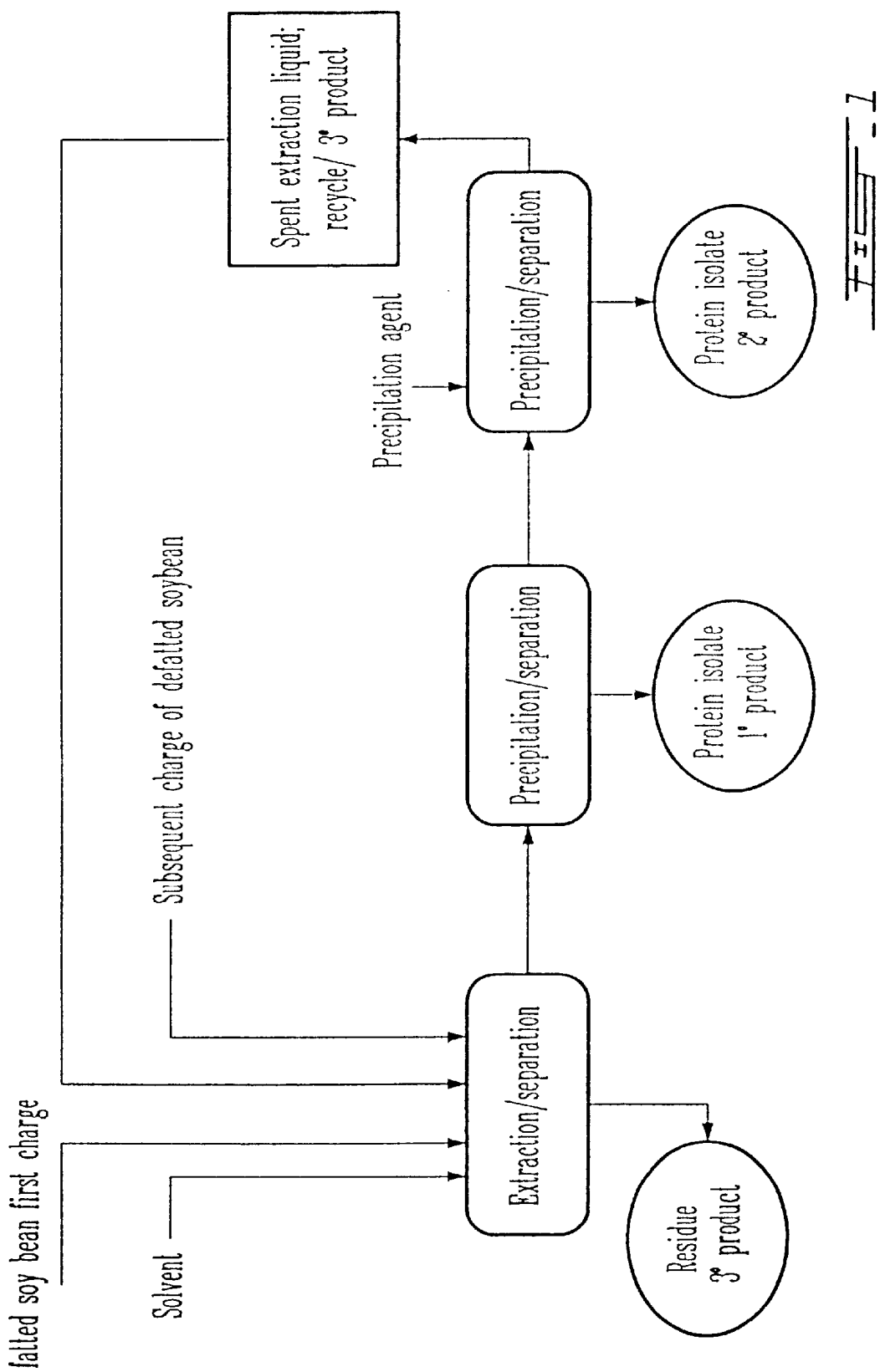
FIG. 1 represents a schematic diagram of a process for isolating a gelling protein from defatted soybean in accordance with one embodiment of the invention.

In accordance with the present invention, it has been discovered that a reduction of the temperature of an alkaline extract of the defatted soybean flour, resulted in a protein cryoprecipitate which, when heated, cooled and mixed with calcium chloride, forms strong protein gels. In addition, the cryoprecipitate shows high solubility. The remaining protein in the alkaline extract of the defatted soybean flour can be recovered by isoelectric precipitation, which is commonly used for protein precipitation. The procedure the present invention is apparent from the steps which are discussed, and the process diagram in FIG. 1.

In a preferred embodiment of the present invention, the gelling protein is extracted as follows.

Commercial ground defatted soybean are extracted with dilute sodium hydroxide solution (0.02%) using a soybean-:solution mixture ratio of 1:10 (weigh/volume). A first extraction was carried out at room temperature for 1 hour.

The soybean solution mixture is then subjected to centrifugation at about 5,000 to 10,000 rpm for 10 to 20 min. to separate a protein solution fraction from a soybean residue fraction. The soybean residue fraction is dried and used as an additive in animal food.

From this protein solution fraction obtained previously, a protein fraction is precipitated by refrigeration for 3 to 24 hours at a temperature of about 0° C. to 4° C. Maximum yields were obtained after 24 hours at 4° C.

A protein from the protein fraction is recovered by a first centrifugation at 5,000 to 10,000 rpm for 10 to 20 min and freeze-dried. A yield of extraction of 22% is obtained. Alternatively, the protein fraction can also be recovered by spray-drying. The protein from this protein fraction is referred to as the primary protein product. Such primary protein product has a protein content of 91%. The protein so recovered is a high gelling, high solubility protein having a molecular weight of approximately 300 kD based on size exclusion chromatography, representing the glycinin or 11S globulin fraction of soybean. The protein so recovered contains sub-units of molecular weights ranging from 35–39 kD and 21–29 kD base on gel electrophoresis in the presence of sodium dodecyl sulfate (SDS-page)

Acid Precipitation of Protein

The supernatant from the last precipitation of the protein solution fraction was further analyzed. The supernatant was adjusted to pH 4.5 with dilute HCl to further precipitate proteins according to their isoelectric properties. This pH represents an isoelectric point of a second protein fraction from the protein solution fraction.

The second protein fraction is recovered by a second centrifugation at 5,000 to 10,000 rpm for 10 to 20 min and freeze-dried. The yield of this isoelectric precipitation of this second protein fraction is 61%. This second protein fraction is referred to as the secondary protein product, with a protein content of 87%. This secondary protein product represents the common protein isolates from soybean, which also have applications known in he industry.

In order to minimize the amount of solvent used in this first extraction, the supernatant from the second centrifugation may be recycled after adjusting to pH 11 with sodium hydroxide solution, for extraction of further batches such as second and third batches of defatted ground soybeans as described previously. The yields of the high gelling protein and the secondary protein product for the second batch were 31% and 40%, respectively, and 21% and 44% for the third batch, respectively. After few cycles of the supernatant of the second centrifugation, this supernatant has accumulated therein along the extraction oligosaccharides. Therefore, as such, this supernatant can be dried and use as a source of oligosaccharides.

In a preferred embodiment of the invention, the gelling protein comprises mainly glycinin or 11S globulin fraction or soybean proteins. In addition, the remaining soybean fractions can be obtained by isoelectric precipitation after removal of the high-gelling protein fraction. Furthermore, the extracting solvent (the alkaline solution) can be recycled for up to three extractions, then the solids which it accumulates can be recovered for use in the animal feed.

Gelling Properties of High Gelling Protein

The gelling properties of the primary product of the present invention are:

i) In the presence of calcium chloride solution (30 mM to 100 mM), strong, stable, smooth, while gels were obtained at a protein concentration of 4% or higher (such as 4% to 16%).

ii) In the absence of calcium chloride, strong, stable, clear gels were obtained at a concentration of 8% w/v or higher.

iii) In addition to its unique gelling characteristics, the gelling protein shows excellent solubility and water holding capacity.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth, and as follows in the scope of the appended claims.

What is claimed is:

1. A process for producing a cold-set gel comprising a gelling protein, said process comprising the steps of:

(i) extracting proteins from ground defatted soybean with an alkaline solution;

(ii) precipitating said high gelling protein from proteins extracted in step (i) by cryoprecipitation;

(iii) isolating the gelling protein from step (ii);

(iv) making an aqueous dispersion of said gelling protein;

(v) heating said dispersion to 60 to 90° C.;

(vi) adding a salt to the dispersion of step v); and (vii) allowing for said dispersion of step vi) to set.

2. The process of claim 1, further comprising before step (ii) the steps of:

a) centrifuging the alkaline solution for obtaining a clarified supernatant containing the gelling protein.

3. The process of claim 1, wherein the step of isolating the gelling protein comprise the steps of centrifugation after the cryoprecipitation for obtaining a pellet containing the gelling protein, and isolating said pellet.

4. The process of claim 1, wherein the salt is selected from the group consisting of calcium chloride, sodium chloride, magnesium chloride, calcium sulfate, and magnesium sulfate.

5. The process of claim 1, further comprising after step (iii) the step of:

(iiia) isoelectric precipitating of an alkaline solution obtained after the isolating of step (iii).

6. The process of claim 5, wherein the step (iiia) of isoelectric precipitating comprises a step of:

(iiib) adjusting the alkaline solution obtained after the isolating of step (iii) to a pH of about 4.5.

7. The process of claim 5, further comprising after the step (iiia) of isoelectric precipitating, a step of separation of a protein isolate for use in food industries and a supernatant containing oligosaccharides.

8. The process of claim 7, wherein the supernatant containing oligosaccharides is recycled and reused in a further step (iv) of said process for obtaining a gelling protein.

9. The process of claim 8, wherein the oligosaccharides are recovered from the supernatant containing oligosaccharides after said supernatant being recycled and reused.

10. A gel ling protein obtained with the process of claim 1.

11. The gelling protein of claim 10, wherein said protein is induced to gel by cold-set gelation.

12. A gel comprising the gelling protein of claim 10, wherein said gel is induced by cold-set gelation of a solution comprising the gelling protein.

* * * * *